United States Patent [19]

Shimizu et al.

[11] 4,453,837
[45] Jun. 12, 1984

[54] THRUST BEARING FOR TURBOCHARGER

[75] Inventors: Masami Shimizu, Chiba; Fusayoshi Nakamura, Ichikawa, both of Japan

[73] Assignee: Ishikawajima-Harima Jukogyo Kabushiki Kaisha, Tokyo, Japan

[21] Appl. No.: 445,733

[22] Filed: Nov. 30, 1982

[30] Foreign Application Priority Data

Dec. 10, 1981 [JP] Japan .................. 56-182974[U]

[51] Int. Cl.³ .................. F16C 32/06; F16C 17/04
[52] U.S. Cl. .................. 3.84/121; 384/368; 308/DIG. 15
[58] Field of Search .............. 303/DIG. 15; 384/107, 384/100, 111, 112, 113, 118, 121, 123, 368, 369, 303, 305, 307; 415/110–113

[56] References Cited

U.S. PATENT DOCUMENTS

| | | | |
|---|---|---|---|
| 3,030,744 | 4/1962 | Mueller | 384/118 X |
| 3,326,453 | 6/1967 | Kun | 308/DIG. 15 X |
| 3,390,926 | 7/1968 | Woollenweber, Jr. | 384/287 |
| 3,494,679 | 2/1970 | Burdette | 384/139 |
| 3,934,948 | 1/1976 | Pruvot | 384/111 |
| 4,326,758 | 3/1982 | Nozue et al. | 384/368 |
| 4,389,052 | 6/1983 | Shimizu et al. | 277/67 |

FOREIGN PATENT DOCUMENTS 55-6412 of 1980 Japan .

*Primary Examiner*—Stuart S. Levy
*Assistant Examiner*—David Werner

[57] ABSTRACT

In a thrust bearing for a turbocharger of the type having a thrust metal formed with a lubricating oil passage in communication with a lubricating oil feed port, a thrust bushing and an oil thrower, the inner peripheral wall of the thrust metal is formed with an annular oil reservoir and a single or plural small-diameter holes are axially extended through the wall of the thrust metal so as to intercommunicate between the oil reservoir and the outer peripheral wall of the thrust metal, that is, the thrust load carrying surface, whereby a sufficient quantity of lubricating oil can issue through such small-diameter holes to the load bearing surface. Because of this arrangement, the overall lubricating oil required may be reduced yet reliable and dependable operation can be ensured. In addition, the thrust load carrying capacity can be remarkably increased.

6 Claims, 5 Drawing Figures

THRUST BEARING FOR TURBOCHARGER

BACKGROUND OF THE INVENTION

The present invention relates to thrust bearings for turbochargers.

In FIG. 1 is shown in side view, partly in section, a prior art turbocharger. In operation, the back pressures of a blower impeller b and a turbine wheel c which are carried by a common shaft a vary depending upon the rotational speed and the operating range; that is, the back pressures fluctuate between the positive and negative pressures. As a result, the common shaft is subjected to axial thrust. In order to prevent the axial motion of the common shaft a due to such thrusts, as shown in detail in FIG. 2, a thrust metal d is rigidly secured to a bearing casing g so as to be sandwiched or interposed between an oil thrower e and a thrust bushing f both carried by the common shaft a so that the thrust metal d carries the thrust loads. With the arrangement as shown in FIG. 2, it is difficult to satisfactorily lubricate the thrust-load carrying interfaces h and h'. As a consequence, oil films, are frequently fractured, resulting in seizure between the thrust metal d on the one hand and the oil thrower e and the thrust bushing f on the other hand. Furthermore, the temperatures of lubricating oil in the interfaces h and h' rise exceedingly. Therefore the thrust bearing of the type just described above has a low load carrying capacity. To overcome this problem, lubricating oil must be circulated in large quantities, but only a small portion of lubricating oil serves to lubricate the interfaces h and h', whereas the remaining lubricating oil merely flows through the interfaces h and h' without effecting any effective lubrication. It follows therefore that flowing of lubricating oil in large quantities serves no lubrication purpose at all.

One of the objects of the present invention is therefore to provide a thrust bearing for a turbocharger in which the construction of a thrust metal is so modified that the overall quanitity of lubricating oil which is required can be reduced yet reliable and dependable operation can be ensured and furthermore the thrust-load carrying capacity can be remarkably increased.

Briefly stated, to the above and other ends, the present invention provides a thrust bearing for a turbocharger of the type having a thrust metal with a radial lubricating feed passage in communication with a lubricating oil supply port, a thrust bushing and an oil thrower, thrust-load carrying interfaces being defined by said thrust metal, said thrust bushing and said oil thrower, characterized in that it comprises an annular groove-like oil reservoir formed on an inner peripheral wall of the thrust metal, and at least a small-diameter hole extending axially into the thrust metal to make the annular groove-like oil reservoir communicate with the thrust-load carrying interfaces.

The above and other objects, features and advantages of the present invention will become more apparent from the description of a preferred embodiment thereof taken in conjunction with the accompanying drawings.

DESCRIPTION OF THE PREFERRED EMBODIMENT

Figure 1:
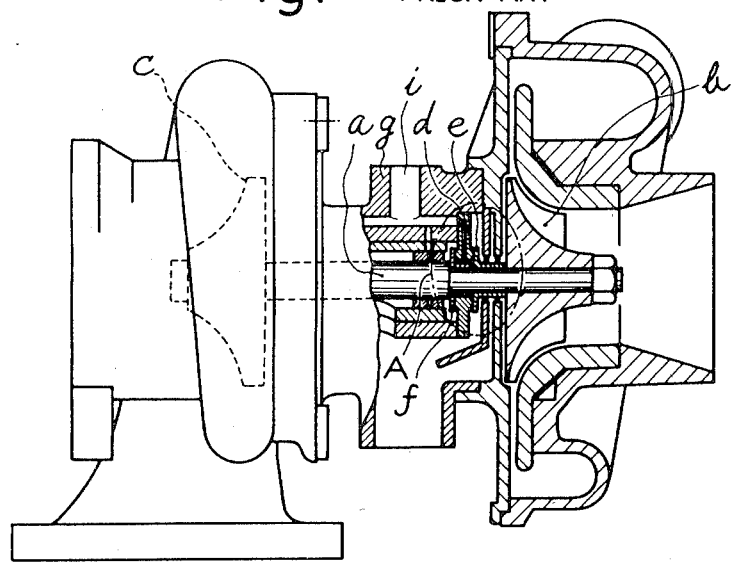
FIG. 1 is a side view, partly in section, of a prior art turbocharger.
Figure 2:
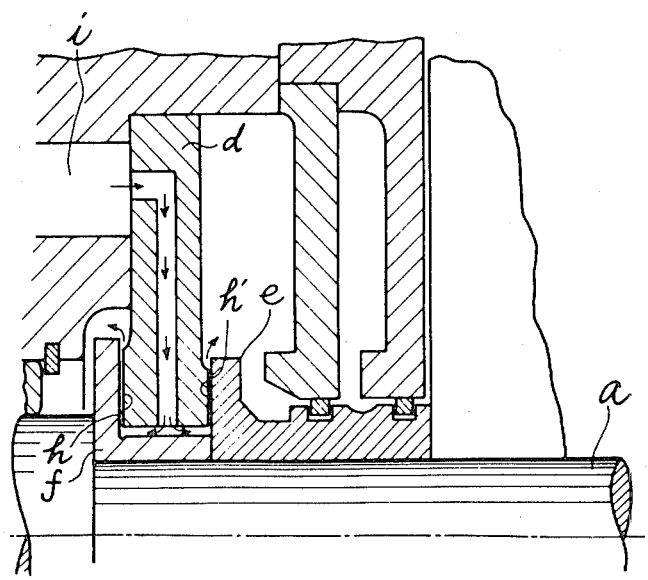
FIG. 2 is a partial view in section, on enlarged scale, of a portion enclosed by Circle A of FIG. 1.
Figure 3:
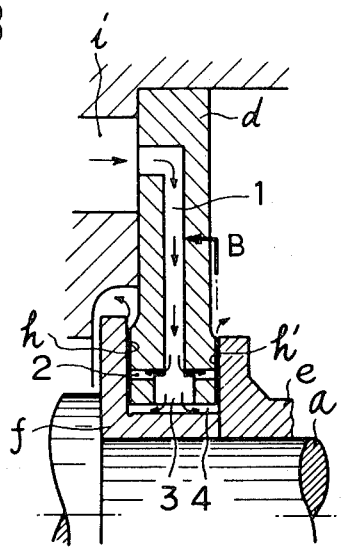
FIG. 3 is a fragmentary sectional view of a preferred embodiment of the present invention corresponding to FIG. 2.

Referring first to FIG. 3 illustrating a preferred embodiment of the present invention, reference numeral 1 designates a radially directed lubricating oil feed passage; 2, an axial hole or holes of a small-diameter and communicated with the feed passage 1; 3, an annular groove-like oil reservoir; and 4, a bottom space in communication with the oil reservoir 3. This embodiment is similar in arrangement to the prior art arrangement as shown in FIGS. 1 or 2 in that the thrust metal d is securely attached to the bearing casing g between the oil thrower e and the thrust bushing f both of which are carried by the common shaft a. However, it should be noted that one end (the upper end in FIG. 3) of the radial lubricating oil feed passage 1 is in communication with a lubricating supply port i and the other end thereof is communicated with the oil reservoir 3 which is annular in shape, and the small-diameter hole or holes 2 intercommunicate between the annular oil reservoir 3 and the thrust-load carrying interfaces h and h'.

According to the present invention, the thrust-load carrying interfaces h and h' may be flat. Alternatively, they are formed with surface irregularities or tapered lands as will be described below so that more effective lubrication may be ensured.

Figure 4:
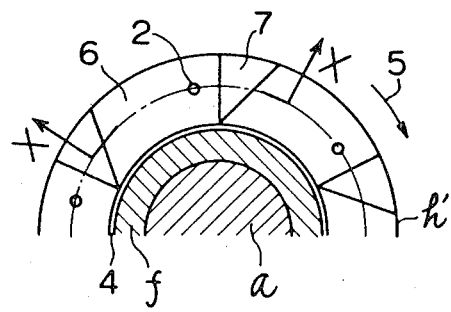
FIG. 4 is a view looking in the direction of Arrow B of FIG. 3.
Figure 5:
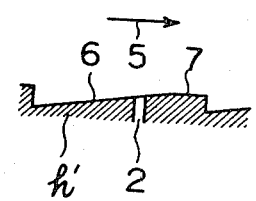
FIG. 5 is a sectional view taken along line X—X of FIG. 4.

Referring to FIGS. 4 and 5, an arrow 5 indicates the direction of rotation of the common shaft a; 6, a tapered portion; and 7, a flat land portion.

In operation, the lubricating oil enters from the supply port i into the radial lubricating oil feed passage 1 as shown in FIG. 3 and then into the oil reservoir 3. The lubricating oil flowing out of the oil reservoir 3 is restricted by the space 4 immediately below and in communication with the oil reservoir 3 so that the lubricating oil flowing through the feed passage 1 into the oil reservoir 3 is divided into the oil flowing through the small-diameter hole or holes 2 on the one hand and the oil flowing into the space 4. The lubricating oil which flows into the space 4 is redirected to flow into the interfaces h and h'. Thus satisfactory lubrication effects can be ensured. The dimensions of the space 4 immediately below the oil reservoir 3 are so selected that sufficient quantities of lubricating oil may flow through the holes 2 to the interfaces h and h'.

As described above, the thrust bearing in accordance with the present invention has a thrust metal whose inner peripheral wall is formed with an annular groove-like oil reservoir 3 which in turn is communicated through a single or plural axial small-diameter holes 2 with the thrust-load carrying interfaces h and h'. The diameter of such small-diameter holes 2 is so selected that a sufficient quantity of lubricating oil may be supplied therethrough to the thrust-load carrying interfaces h and h'. In addition, these load-carrying interfaces h and h' can be lubricated with the oil flowing from the space 4 immediately below the oil reservoir 3 into the spacings between the thrust metal d on the one hand and the oil thrower e and the thrust bushing f on the other hand. To put into another way, the thrust-load carrying interfaces h and h' are lubricated with the oil issuing not only through the small-diameter hole or holes 2 but also from the space 4 below the reservoir 3. As a consequence, the recirculating lubricating oil can substantially serve to lubricate the thrust-load carrying interfaces h and h'. As a result, the required volume of lubricating oil can be reduced. In addition, the temperature rise of lubricating oil can be suppressed. Therefore the thrust-load carring capacity can be condiserably increased as compared with the prior art thrust bearing. It should be noted that the reduction in volume of lubricating oil results in the reduction in mechanical losses to a considerably degree.

What is claimed is:

1. An improvement in a thrust bearing for a turbocharger having a thrust metal member secured to a bearing casing to be interposed between an oil thrower and a thrust bushing for carrying thrust loads at interfaces defined between the thrust metal member, the oil thrower and the thrust bushing, the thrust metal member having a lubricating oil passage defined therein to receive lubricating oil from a supply port and transfer that lubricating oil toward the thrust bushing, the improvement comprising:
   (A) an oil reservoir means defined in the thrust metal member between the lubricating oil passage and the thrust bushing for receiving a supply of lubricating oil from the oil passage; and,
   (B) a lubricating oil distributing means for conducting lubricating oil from said reservoir means to a plurality of locations on the interfaces, said lubricating oil distributing means including:
      (1) a plurality of small diameter passage means fluidly connecting said oil reservoir means to the interfaces at first locations for supplying a first quantity of lubricating oil to the interfaces; and
      (2) a lubricating oil channel means located between the thrust metal member and the thrust bushing and fluidly connecting said oil reservoir means to the interfaces at second locations, with the thrust bushing closing one end of said channel means and the oil thrower closing the other end of said channel means so said channel means terminates at the interfaces for recirculating essentially all of the oil transferred to said lubricating oil channel means to the interfaces to be added to said first quantity of lubricating oil, said lubricating oil channel means being sized according to the size of said passage means for supplying enough lubricating oil to the interfaces to adequately and uniformly lubricate the interfaces.

2. The improvement defined in claim 1 wherein said reservoir means includes a groove defined in the thrust metal member.

3. The improvement defined in claim 2 wherein said groove is larger than the lubricating oil passage.

4. The improvement defined in claim 3 wherein said small diameter passages are located adjacent to the intersection between said groove and the lubricating oil passage.

5. The improvement defined in claim 4 wherein said passage means is located at one end of said reservoir means and said channel means is located at another end of said reservoir means.

6. A thrust bearing as set forth in claim 1 wherein at least one of said thrust-load carrying interfaces of said thrust metal members, said thrust bushing and said oil thrower has surface irregularities.

* * * * *